Patented Feb. 10, 1931

1,791,562

UNITED STATES PATENT OFFICE

FRITZ HOFMANN AND CARL WULFF, OF BRESLAU, GERMANY

CRACKING OILS

No Drawing. Application filed November 26, 1928, Serial No. 322,082, and in Germany November 27, 1927.

This invention relates to an improved process for cracking oils.

It is known, that the thermal decomposition of hydrocarbons in the presence of aluminium chlorid leads to valuable products. This process is carried out on an industrial scale in the cracking of oils. The catalytic action of ferrous chlorid and of ferric chlorid have also been made use of in the said process.

We have now found that the halides of boron, namely, the compounds of boron with fluorine, chlorine, iodine or bromine, or the addition or substitution products of these compounds are particularly excellent catalysts for the cracking of hydrocarbons. When the said catalysts are employed, a particularly good yield of valuable hydrocarbons is obtained and only very small amounts of gaseous hydrocarbons, such as methane, or of carbon deposits are produced. That the said halides of boron or the addition or substitution products of the said compounds could be employed as catalysts in cracking processes, was very surprising, since hitherto the halides of boron were only employed as catalysts facilitating polymerization, that is to say, in reactions in which compounds of lower molecular weight were converted into such of higher molecular weight. The cracking of oils is however a reaction in which substances of higher molecular weight are split into such of lower molecular weight.

Wherever the expression "halides of boron" is employed in the present specification, it is also intended to include the addition and substitution products of the said compounds.

The fact, that the said compounds of boron are gases or liquids at atmospheric pressures, renders them far more suitable for employment in cracking than aluminium chlorid, which is a solid, at atmospheric temperature, since the halides of boron can therefore be removed by moderate heating, whereas aluminium chloride can only be vaporized at comparatively high temperatures. Furthermore, if a mixture of the vapours of hydrocarbons and aluminium chloride be subjected to condensation both the hydrocarbon and the aluminium chloride are condensed whereas, if a mixture of vapours of hydrocarbons and of halides of boron be subjected to cooling substantially only the hydrocarbon is condensed. Boron fluoride can be removed from liquid hydrocarbons by simply passing an inert gas therethrough. The advantage of working with a halide of boron is further particularly apparent when working in the gaseous phase, since gases and liquids can be far more uniformly distributed than solids. The gaseous or liquid state of the said compounds of boron also renders them particularly suitable for regeneration.

By cracking oils in the presence of the said halides of boron, in particular in the presence of hydrogen, it is possible to convert products of high boiling point range into benzines of a saturated character which contain only very little sulfur. The reaction products of higher boiling points thus obtained are distinguished by having only a very low bromine number.

The process of cracking may be carried out under known conditions, for example at temperatures of about 250° to 800° C. It may also be advantageous to add other gases, such as hydrogen or gases capable of supplying hydrogen or containing it, such as gaseous hydrocarbons or water vapor, or nitrogen. The cracking process may also be carried out at elevated pressure.

The following example will further illustrate the nature of the said invention, but the invention is not limited thereto.

*Example*

1000 parts by weight of a crude mineral oil boiling above 300° C. are cracked in a pressure vessel with an addition of 5 per cent of boron fluorid under a pressure of hydrogen of 150 atmospheres and at a temperature of 380° C. When working up the distillate, about 75 per cent of the product are recovered in the form of an oil boiling up to 250° C. and 15 per cent thereof are recovered in the form of a highly viscous lubricating oil, both products having only a low content of sulfur and a low bromine number. Only small amounts of methane and carbon deposits are produced.

The process of the present invention is applicable for cracking hydrocarbons from any source.

What we claim is:—

1. A process for the production of valuable hydrocarbons of low boiling point range which comprises cracking a hydrocarbon oil, in the presence of a halide of boron.

2. A process for the production of valuable hydrocarbons of low boiling point range, which comprises cracking a hydrocarbon oil in the presence of a halide of boron while adding a gas supplying hydrogen.

3. A process for the production of valuable hydrocarbons of low boiling point range, which comprises cracking a hydrocarbon oil in the presence of boron fluoride while adding a gas supplying hydrogen.

4. A process for the production of valuable hydrocarbons of low boiling point range, which comprises cracking a hydrocarbon oil under pressure in the presence of a halide of boron while adding a gas supplying hydrogen.

5. A process for the production of valuable hydrocarbons of low boiling point range which comprises cracking a hydrocarbon oil in the presence of boron fluoride.

6. A process for the production of valuable hydrocarbons of low boiling point range which comprises cracking a hydrocarbon oil under pressure in the presence of boron fluoride while adding a gas supplying hydrogen.

7. The process of cracking crude mineral oils which comprises treating the said oils under a pressure of 150 atmospheres of hydrogen and at a temperature of about 380° C. in the presence of boron fluorid.

In testimony whereof we have hereunto set our hands.

FRITZ HOFMANN.
CARL WULFF.